United States Patent [19]
Nakatani

[11] Patent Number: 5,379,239
[45] Date of Patent: Jan. 3, 1995

[54] WAVEFORM DISPLAY DEVICE

[75] Inventor: Rintaro Nakatani, Tokyo, Japan

[73] Assignee: Seiko Instruments Inc., Tokyo, Japan

[21] Appl. No.: 799,834

[22] Filed: Nov. 27, 1991

[30] Foreign Application Priority Data

Nov. 28, 1990 [JP] Japan ................................ 2-331021

[51] Int. Cl.$^6$ .............................................. G06F 7/00
[52] U.S. Cl. ................................ 364/715.05; 345/134
[58] Field of Search ............... 340/747, 728, 721, 731, 340/722, 723, 799, 750; 364/715.05, 715.03, 551.01, 718; 324/121 R; 341/83, 82; 345/134, 133, 185

[56] References Cited

U.S. PATENT DOCUMENTS

| | | | |
|---|---|---|---|
| 3,855,459 | 12/1974 | Hakata | 364/715.03 |
| 4,481,598 | 11/1984 | Ishiwata | 364/715.05 |
| 4,686,643 | 8/1987 | Ishiwata | 364/715.05 |
| 4,751,504 | 6/1988 | Slavin | 340/709 |
| 4,881,189 | 11/1989 | Proctor | 364/715.05 |
| 5,101,368 | 3/1992 | Kaplan | 364/715.05 |

Primary Examiner—Alvin E. Oberley
Assistant Examiner—Xiao M. Wu
Attorney, Agent, or Firm—Spensley Horn Jubas & Lubitz

[57] ABSTRACT

A waveform display device for shortening the working time for displaying a waveform representing physical quantity data which has been obtained by an analyzing instrument or the like, the device allowing input of data associated with different units of measurement. In the waveform display device, data composed of numerical values and units are input, and the numerical values and units are separated from each other. The numerical values are converted to internal data of a waveform display member while the units are analyzed to calculate a multiplier and/or an offset value, and the internal data to which the numerical values are converted are subjected to a processing using the multiplier and the offset value thus obtained. The calculation result is converted to a display coordinate value and displayed on a display member, so that the data input in different measuring units are converted into a single selected measuring unit.

3 Claims, 2 Drawing Sheets

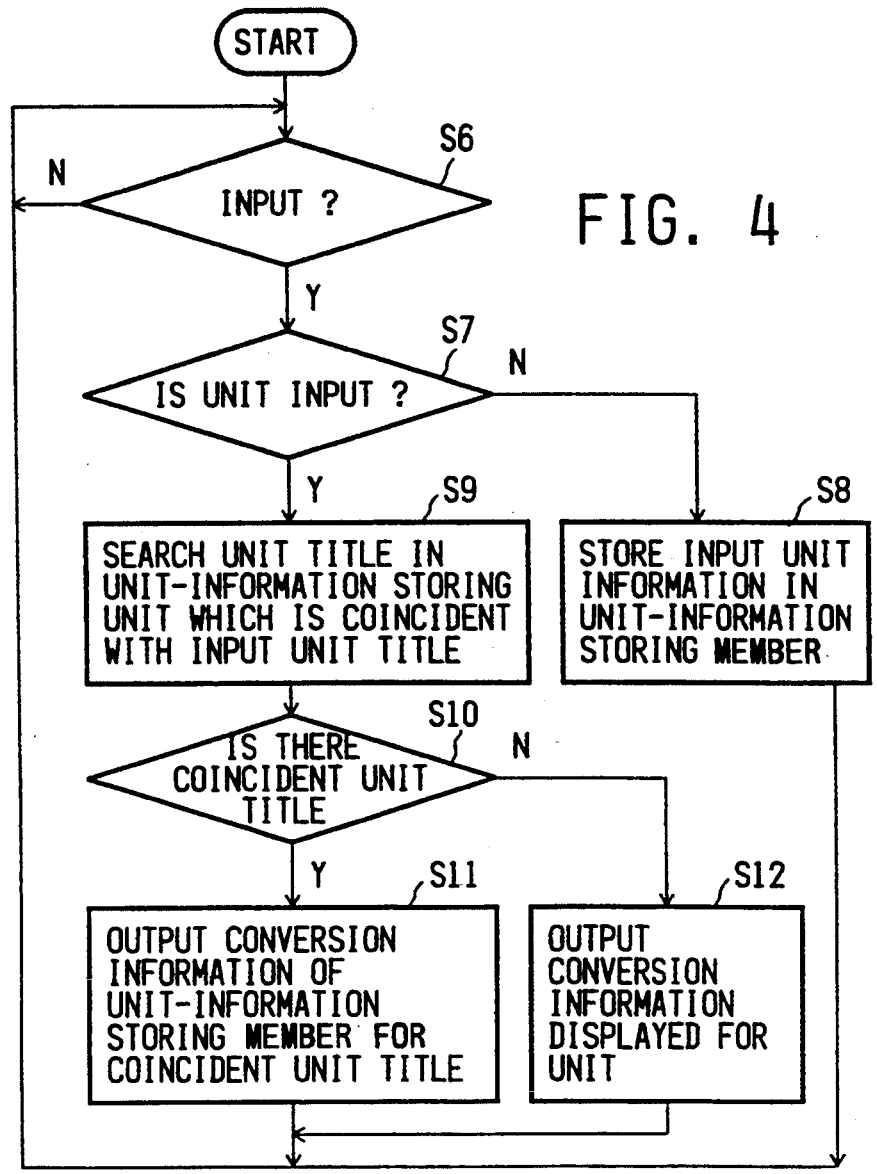

WAVEFORM DISPLAY DEVICE

BACKGROUND OF THE INVENTION

This invention relates to a waveform display device. Known devices of this type are capable of displaying a waveform and values associated with the waveform using only one unit of measure.

Various kinds of units are used for indicating the value of a physical quantity obtained by an analyzing device and so on in accordance with the kind of analyzing device, the field of application and the requirements of the user. For example, in the case where a graph showing a relationship between temperature and quantity of heat is required to be drawn in thermal analysis, etc., "K", "°C.", "°F. ", are used as the unit for temperature and "J", "cal", "WS", "erg", "Btu" and so on are used as the unit for quantity of heat.

When those data which are represented in the above units are displayed on the same graph in the conventional display device, the unit to be used for display on each axis of the graph is first determined. Thereafter, a user manually converts each data value to a corresponding value in terms of a desired unit, and this converted data is used for the display, so that not only a long working time is required for the display, but also errors frequently occur in the conversion operation.

SUMMARY OF THE INVENTION

It is a primary object of the present invention to overcome the above disadvantages.

The above and other objects are achieved, according to the present invention, by the provision of a waveform display device which comprises a data input member for inputting data, a numerical value/unit separator for separating the input data into a numerical value portion and a unit portion, a numerical value analyzer for converting the separated numerical value to internal data of a waveform display member, a unit-information storing member for storing information representing a relationship between a base unit and a displayed unit, a unit analyzer for analyzing the separated unit portion using the unit information stored in the unit-information storing member, a data calculator for subjecting the internal data of the numerical value to a conversion calculation for the displayed unit on the basis of the information obtained in the unit analyzer, a coordinate converter for converting the internal data to coordinate data, and the waveform display member for displaying a waveform in accordance with the coordinate data.

Desired data is first input through the data input member. The input data is separated into a numerical value and a unit in the numerical value/unit separator. The unit is analyzed using information of the unit-information storing member in the unit analyzer, and information representing a manner of converting data in terms of the input unit to data in terms of displayed unit is supplied to the data calculator. The numerical value is converted to the internal data of the waveform display member in the numerical value analyzer, and then is input to the data calculator to be converted to the corresponding data in terms of the displayed unit in accordance with the information outputted from the unit analyzer. The converted data is converted by the coordinate converter to the coordinate data which is recognizable by the waveformdisplay unit, and a waveform is displayed using the coordinate data by the data display unit.

BRIEF DESCRIPTION OF THE DRAWING

FIG. 3 is an explanatory diagram showing exemplary unit information which can be processed in a device according to the invention.

FIG. 4 is a flowchart illustrating the operation of a unit analyzer according to another embodiment of the invention.

DESCRIPTION OF THE PREFERRED EMBODIMENTS

A preferred embodiment of this invention will be described with reference to the accompanying drawings.

Figure 1:
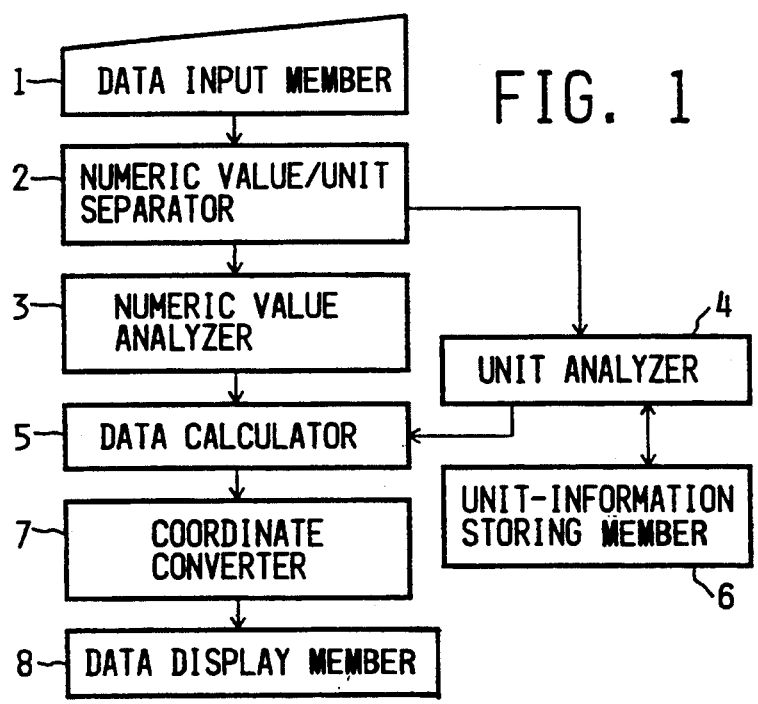
FIG. 1 is a block diagram for an embodiment of a waveform display device according to this invention.

In FIG. 1, an operator inputs data comprising the numerical values and units of respective data points through a data input member 1. The input data is separated into numerical values and units in a numerical value/unit separator 2. Usually, the numerical values and the units are separated with a special sign between them. The separated numerical values are converted to data in an internal data format of the waveform display device (generally, with floating-point representation). On the other hand, the units which have been inputted are analyzed using information from a unit-information storing member 6 by a unit analyzer 4, and conversion information is outputted to a data calculator 5.

Figure 2:
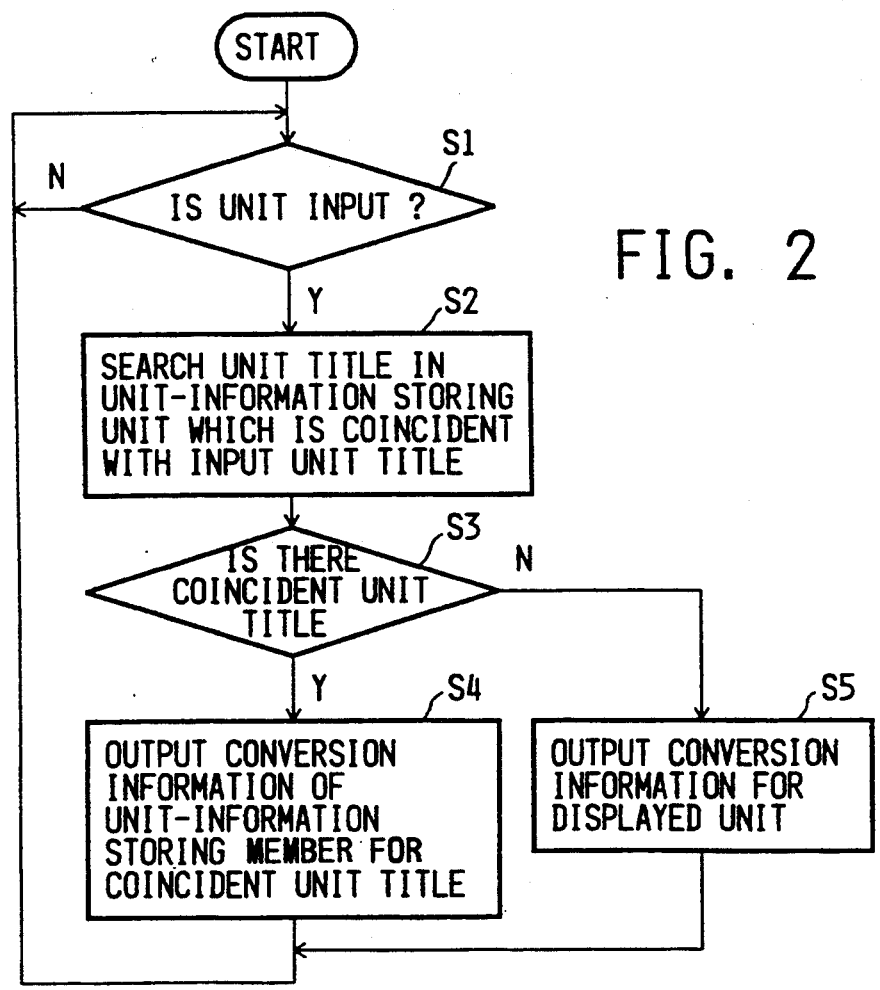
FIG. 2 is a flowchart illustrating the operation of a unit analyzer used in this invention.

A typical operation of the unit analyzer 4 will be described with reference to the flowchart of FIG. 2. The unit analyzer 4 is ordinarily on standby for an input from the numerical value/unit separator 2, detected in step S1. Upon input of a unit, the unit analyzer 4 compares, in step S2, the inputted unit with each of a plurality of unit titles contained in a list in unit-information storing member 6.

As shown in an example of the unit information of FIG. 3, the unit information includes unit titles and conversion information on the basis of which inputted data is converted to data in terms of a displayed unit. In the example of FIG. 3, the conversion information includes multipliers and addends for displayed units K, °C., °F., etc. If there is coincidence between the inputted unit and one of the stored unit titles, determined in step S3, the conversion information for the coincident unit title is outputted to the data calculator 5 in step S4. On the other hand, if there is no coincidence between the inputted unit and any one of the stored unit titles, the conversion information for the currently-displayed unit is outputted to the data calculator 5 in step S5. After completing the above processing, the unit analyzer 4 is placed on standby for the next input thereto.

The data calculator 5 is on standby for inputs from the numerical value analyzer 3 and the unit analyzer 4, and upon receiving these inputs, the data calculator 5 calculates the data outputted from the numerical value analyzer 3 in accordance with the conversion information outputted from the unit analyzer 4 to convert the numerical data to corresponding data for the units in which the data is to be displayed. The coordinate converter 7 further converts the converted data to coordinate data which is recognizable by the data display member 8, and the data display member 8 displays a data waveform using the coordinate data.

FIG. 4 is a flowchart for the operation of a unit analyzer according to another embodiment of the invention. This unit analyzer enables the information of the unit-information storing member to be refreshed. The operation will be described with reference to the flowchart of FIG. 4.

The unit analyzer is ordinarily on standby for an input of the numerical value/unit separator in step S6, and when an input occurs, a determination is made, in step S7, as to whether the input is a unit from separator 2 or unit information from member 6. Ordinarily, the judgment is made on the condition that if the input includes character data (for example, #, etc.) which is not used for a unit, the input is regarded as unit information. If the input is unit information, the unit information is stored in the unit-information storing member 6, in step S8. On the other hand, if the input is not unit information, then in steps S9, S10, S11 and S12, which can be identical to steps S2, S3, S4 and S5 of FIG. 2, the information in the unit-information storing member 6 is searched to output desired conversion information to data calculator 5.

As described above, according to this invention, data composed of a mixture of different units can be inputted without manual data conversion by an operator, so that the working time for displaying a waveform of the data can be shortened, and data input errors can be reduced to omit some processings. By way of example, referring again to FIG. 3, in the illustrated table of temperature units, K is a base unit from which values in units of °C. and °F. can be derived. If temperature values are to be displayed in units of °C., a temperature value inputted in units of K will be subject to the conversion shown for °C. A temperature value inputted in units of °F. could be converted back to units of K and then reconverted to units of °C.

This application relates to subject matter disclosed in Japanese Application number 2-331021, filed on Nov. 28, 1990, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A waveform display device comprising:
   a data input member for inputting data composed of numerical values and an indication of the measuring units to which the numerical values relate;
   a numerical value/unit separator connected to said data input member for separating the data inputted to said data input member into a numerical value portion and a unit portion;
   a unit-information storing member for storing unit information including a unit title and conversion information for a unit to be used in a waveform displaying operation;
   a unit analyzer connected to said separator and to said unit-information storing member for analyzing the unit portion separated in said separator on the basis of the unit information stored in said unit-information storing member, and outputting the corresponding conversion information for the unit which is to be used in the waveform displaying operation;
   a numerical value analyzer connected to said separator for converting the numerical value portion separated in said separator into internal data;
   a data calculator connected to said numerical value analyzer and to said unit analyzer for converting the internal data from said numerical value analyzer, using the conversion information from said unit analyzer, into post-conversion internal data in terms of the unit to be used in the waveform displaying operation and outputting the post-conversion internal data;
   a coordinate converter connected to said data calculator for converting the post-conversion internal data into corresponding coordinate data; and
   a display member connected to said coordinate converter for displaying a waveform in accordance with the coordinate data.

2. The waveform display device as claimed in claim 1 wherein said unit-information storing member comprises a read-only storage component for storing at least a part of the unit information.

3. The waveformdisplay device as claimed in claim 1 wherein said unit analyzer comprises means for rewriting unit information in said unit-information storing member in accordance with information contained in unit portions separated in said separator.

* * * * *